United States Patent
Lee et al.

(10) Patent No.: US 12,372,445 B2
(45) Date of Patent: Jul. 29, 2025

(54) SYSTEM FOR MEASURING PHYSICAL PROPERTIES OF ELECTRODE SPECIMEN USING MASKING TAPE, AND METHOD FOR MEASURING PHYSICAL PROPERTIES USING SAME

(71) Applicant: LG ENERGY SOLUTION, LTD., Seoul (KR)

(72) Inventors: Sang Myeon Lee, Daejeon (KR); Ki Hoon Paeng, Daejeon (KR); Jae Won Moon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 155 days.

(21) Appl. No.: 17/913,134

(22) PCT Filed: Aug. 24, 2021

(86) PCT No.: PCT/KR2021/011255
§ 371 (c)(1),
(2) Date: Sep. 20, 2022

(87) PCT Pub. No.: WO2022/085919
PCT Pub. Date: Apr. 28, 2022

(65) Prior Publication Data
US 2023/0213420 A1    Jul. 6, 2023

(30) Foreign Application Priority Data
Oct. 20, 2020    (KR) .................. 10-2020-0136044

(51) Int. Cl.
*G01N 3/08*    (2006.01)
*H01M 10/38*    (2006.01)

(52) U.S. Cl.
CPC .............. *G01N 3/08* (2013.01); *H01M 10/38* (2013.01); *G01N 2203/0017* (2013.01); *G01N 2203/0429* (2013.01)

(58) Field of Classification Search
None
See application file for complete search history.

(56) References Cited

U.S. PATENT DOCUMENTS

| | | | |
|---|---|---|---|
| 2015/0180072 A1* | 6/2015 | Lee | H01M 8/1004 156/308.2 |
| 2017/0003239 A1* | 1/2017 | Jeong | G01M 99/00 |

(Continued)

FOREIGN PATENT DOCUMENTS

| | | |
|---|---|---|
| CN | 104931335 A | 9/2015 |
| CN | 106404539 A | 2/2017 |

(Continued)

OTHER PUBLICATIONS

Extended European Search Report (with partial translation) dated Sep. 15, 2023, issued in corresponding European Patent Application No. 21882992.7.

(Continued)

*Primary Examiner* — Mark A Shabman
(74) *Attorney, Agent, or Firm* — Morgan, Lewis & Bockius LLP (57) ABSTRACT

A system and method facilitates measuring physical properties of an electrode specimen. Accordingly, it is possible to suppress a slipping phenomenon of an electrode specimen and prevent disconnection of a gripping portion during a tensile test for the electrode specimen by forming a tape on the gripping portion of the electrode specimen and forming a grid pattern on the surface of a pressing jig.

8 Claims, 9 Drawing Sheets

(56) References Cited

U.S. PATENT DOCUMENTS

| | | | | |
|---|---|---|---|---|
| 2017/0119600 | A1* | 5/2017 | Bewick-Sonntag | ........................ A61F 13/534 |
| 2018/0034057 | A1 | 2/2018 | Suzuki et al. | |
| 2019/0265135 | A1* | 8/2019 | Jeong | .................... H01M 10/00 |
| 2021/0372896 | A1* | 12/2021 | Ertl | ........................ G01N 3/08 |

FOREIGN PATENT DOCUMENTS

| | | |
|---|---|---|
| CN | 206362621 U | 7/2017 |
| CN | 108225909 A | 6/2018 |
| CN | 208012951 U | 10/2018 |
| CN | 111289354 A | 6/2020 |
| JP | 2012-247208 A | 12/2012 |
| KR | 10-1262893 B1 | 5/2013 |
| KR | 10-1664721 B1 | 10/2016 |
| KR | 2017-0035719 A | 3/2017 |
| KR | 10-2017-0113597 A | 10/2017 |
| KR | 10-2019-0002317 A | 1/2019 |
| KR | 10-2122653 B1 | 6/2020 |
| KR | 10-2020-0093883 A | 8/2020 |

OTHER PUBLICATIONS

Zhang, "Constitutive behavior and progressive mechanical failure of electrodes in lithium-ion batteries", Journal of Power Sources, vol. 357, Jul. 1, 2017, pp. 126-137.

Instron, "7 Tips for Materials Testing", Dec. 31, 2006, pp. 1-11. (https://www.instron.com/th-th/-/media/literature-library/whitepapers/2007/03/7-tips-for-materials-testing.pdf).

International Search Report (with partial translation) and Written Opinion dated Nov. 30, 2021 issued in corresponding International Patent Application No. PCT/KR2021/011255.

Office Action dated Mar. 21, 2025 for the corresponding Chinese Patent Application No. 202180022999.8.

Office Action of May 31, 2025 issued in the counterpart Korean Patent Application No. 10-2020-0136044 with machine translation.

* cited by examiner

SYSTEM FOR MEASURING PHYSICAL PROPERTIES OF ELECTRODE SPECIMEN USING MASKING TAPE, AND METHOD FOR MEASURING PHYSICAL PROPERTIES USING SAME

TECHNICAL FIELD

This application claims the benefit of priority based on Korean Patent Application No. 10-2020-0136044, filed on Oct. 20, 2020, and the entire contents of the Korean patent application are incorporated herein by reference.

The present invention relates to a system for measuring a physical property of an electrode specimen using a masking tape, and a method of measuring a physical property using the same.

BACKGROUND ART

With the increase in technology development and demand for mobile devices, the demand for secondary batteries is also rapidly increasing. Among them, lithium secondary batteries are widely used as an energy source for various electronic products as well as various mobile devices because of their high energy density and high operating voltage and excellent storage and lifetime characteristics.

In addition, the secondary battery has attracted attention as an energy source of an electric vehicle, a hybrid electric vehicle, etc., which are proposed as a solution for air pollution of existing gasoline vehicles and diesel vehicles using fossil fuel. In order to be applied as an energy source of an electric vehicle, a high-power battery is required.

This secondary battery is being developed as a model capable of realizing high voltage and high capacity at the request of consumers. In order to realize high capacity, an optimization process of a positive electrode material, a negative electrode material, a separator, and an electrolyte solution, which are the four major elements of a secondary battery, is required within a limited space.

Further, an electrode applied to a secondary battery is prepared by applying an electrode slurry on a current collector in the form of a metal thin film and drying the electrode slurry. Since mechanical/environmental load is applied to the electrode during the electrode manufacturing process, electrode specimens need to be sampled after a specific step or for each portion, and physical property evaluation therefor is required.

Figure 1:
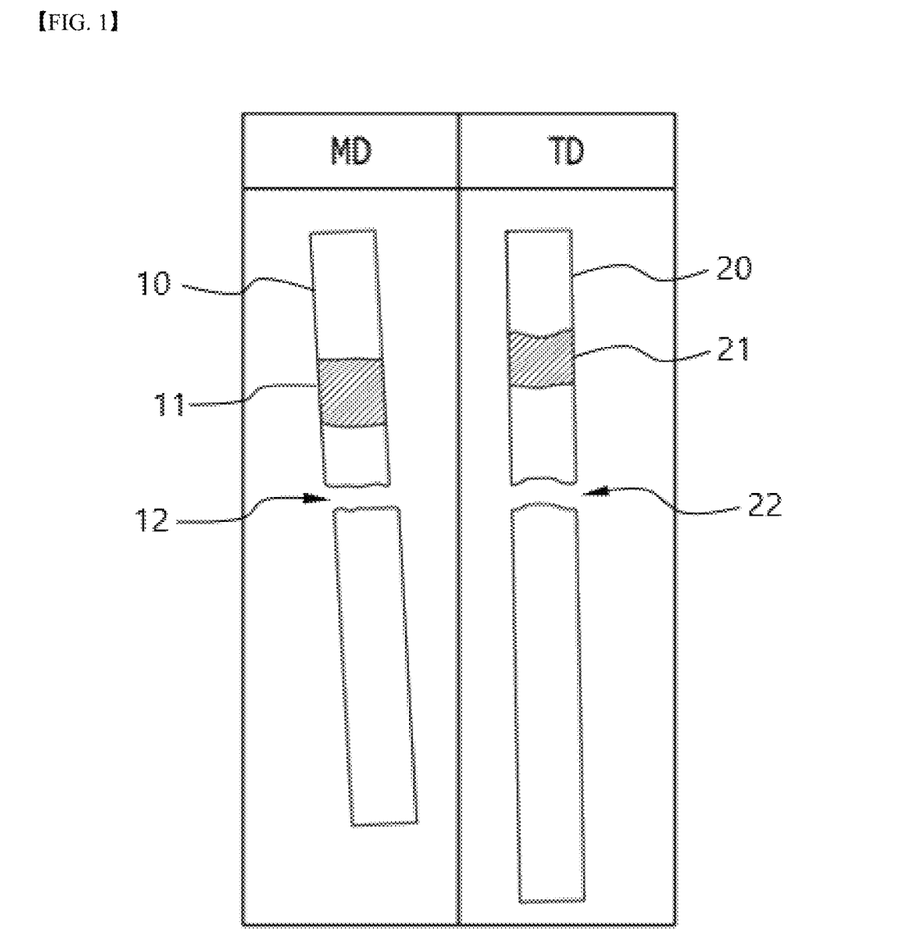
FIG. 1 shows photographs obtained by photographing electrode specimens which were extracted in a conventional method and went through a tensile test.

FIG. 1 shows photographs obtained by photographing electrode specimens which were extracted in a conventional method and went through a tensile test. Referring to FIG. 1, electrode specimens 10 and 20 are extracted from an electrode substrate in a machine direction (MD) and a transverse direction (TD), and tensile strength was measured for the extracted electrode specimens 10 and 20 without a separate treatment. Further, though not illustrated in FIG. 1, tensile strengths for an electrode specimen including a coated part and a non-coated part and an electrode specimen which includes a coated part and a non-coated part and from which an insulating tape formed on the boundary region has been removed were measured. Specifically, tensile strength was measured until an electrode specimen was disconnected in a state that the electrode specimen was fixed at a tensile strength measuring apparatus.

In FIG. 1, disconnected parts 12 and 22 are found in central regions during the process of measuring tensile strengths of respective electrode specimens 10 and 20. Further, slipped portions 11 and 21, which were lightly discolored as the electrode specimens 10 and 20 were slipped, are shown in the lower side of the gripping portions of respective electrode specimens 10 and 20. This indicates that a slip has occurred during the process of measuring tensile strength of each electrode specimen 10 or 20, and the reliability of the measurement result has not been secured.

Figure 2:
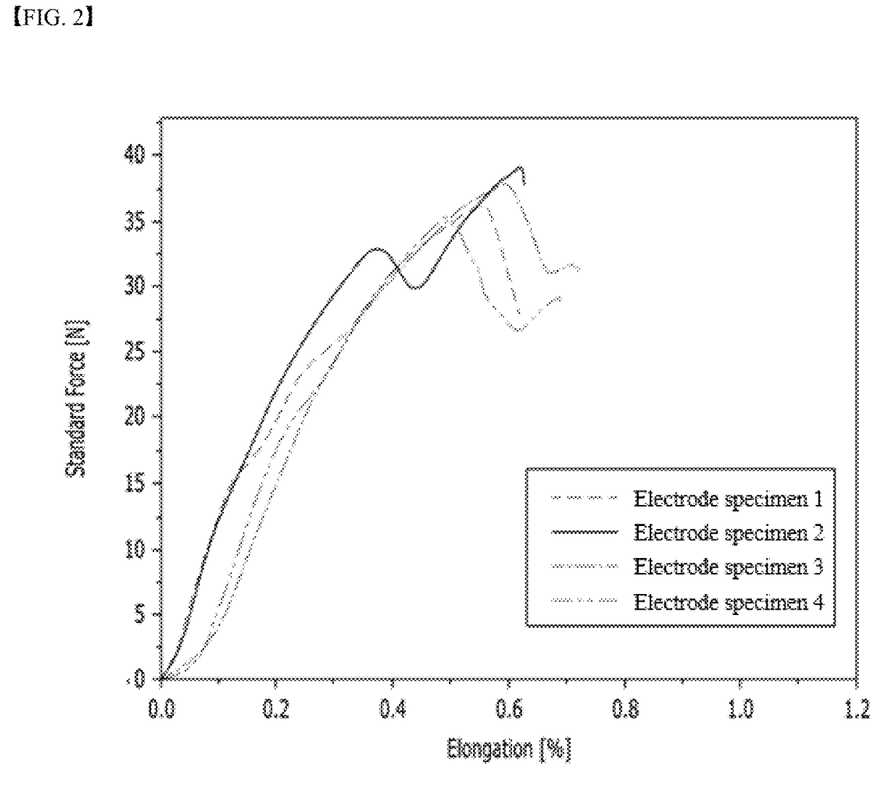
FIG. 2 is a graph illustrating a result of measuring tensile strengths for electrode specimens of FIG. 1.

FIG. 2 is a graph illustrating a result of measuring tensile strengths for electrode specimens of FIG. 1. In FIG. 2, electrode specimen 1 means an electrode specimen extracted from an electrode substrate in a machine direction (MD) and electrode specimen 2 means an electrode specimen extracted from the electrode substrate in a transverse direction (TD). Further, electrode specimen 3 means an electrode specimen including a coated part and a non-coated part, and electrode specimen 4 means an electrode specimen which includes a coated part and a non-coated part and from which an insulating tape formed at a boundary region has been removed.

Referring to FIG. 2, with respect to electrode specimens 1 to 4, as the elongation of each electrode specimen increases, the tensile force (standard force, N) increases to a certain point, decreases, and then increases again. A section, where tensile force decreases for each electrode specimen, indicates that a slipping phenomenon of the electrode specimen has occurred during the measuring process. Hence, if the tensile strength is measured after preparing an electrode specimen by a conventional scheme, it is difficult to accurately measure physical properties due to a slipping phenomenon.

DISCLOSURE

Technical Problem

The present invention is believed to solve at least some of the above problems. For example, an aspect of the present invention provides a system for accurately measuring a physical property of an electrode specimen by using a masking tape, and a physical property measuring method using the same.

Technical Solution

A system for measuring a physical property of an electrode specimen according to the present invention includes: an electrode specimen having a structure where a masking tape is formed on one-side gripping portion or both-side gripping portions; and a tensile strength measuring unit which includes a first gripping unit for gripping the one-side gripping portion of the electrode specimen and a second gripping unit for gripping an other-side gripping portion, and measures tensile strength for the electrode specimen by moving the electrode specimen in a pulling direction by at least one of the first and second gripping units which are located on a same line. In one example, each of the first and second gripping units includes a pressing jig having a structure facing each other while having a gripping portion of the electrode specimen therebetween, and wherein the pressing jig includes a rubber or metal jaw face.

In one example, the electrode specimen includes only a coated part region where an electrode mixture layer is formed on a surface of a metal current collector. In this case, the electrode specimen has a structure where a masking tape is formed at each of the both-side gripping portions, and the pressing jig of the first and second gripping units includes a metal jaw face where a grid is formed on a surface.

In another example, the electrode specimen includes a coated part region where an electrode mixture layer is formed on a surface of a metal current collector, and one end of the electrode specimen includes a non-coated part region where an electrode mixture layer is not formed on the surface of the metal current collector. In this case, the electrode specimen has a structure where a masking tape is formed on a gripping portion of a coated part region, and a masking tape is not formed on a gripping portion of a non-coated part region, the pressing jig of the first gripping unit grips the gripping portion of the coated part region and includes a metal jaw face where a grid is formed on a surface, and the pressing jig of the second gripping unit grips the gripping portion of the non-coated part region and includes a rubber jaw face.

In one example, the metal jaw face has a structure where a debossed or embossed grid is formed on a surface.

In a specific example, an average recess depth or an average protrusion height of the debossed or embossed grid formed on the surface of the metal jaw face is in a range of 0.001 to 1 mm.

In another example, the pressing jig, which forms at least one of the first and second gripping units, is detachable from a frame which forms a tensile strength measuring unit.

In a specific example, the pressing jig, which forms at least one of the first and second gripping units, is detachable from a frame which forms a tensile strength measuring unit, and the pressing jig is detachable by at least one of a fastening scheme between a groove and a protrusion, a bolt fastening scheme, and a spring fastening scheme.

In one example, masking tapes are formed on both surfaces of the gripping portion and overlap each other.

Further, the present invention provides a method of measuring a physical property of an electrode specimen by using the above-described system for measuring a physical property of an electrode specimen.

In one example, the method of measuring a physical property of an electrode specimen according to the present invention includes: preparing at least one of an electrode specimen extracted in an MD direction in a coated part region from an electrode substrate, an electrode specimen extracted in a TD direction in the coated part region from the electrode substrate, and an electrode specimen extracted in a region including the coated part region and a non-coated part region from the electrode substrate; and measuring tensile strength of the prepared electrode specimen.

In a specific example, the method of measuring a physical property of an electrode specimen according to the present invention includes: preparing at least two of an electrode specimen in an MD direction in a coated part region from an electrode substrate, an electrode specimen extracted in a TD direction from the coated part region from the electrode substrate, and an electrode specimen extracted in a region including the coated part region and a non-coated part region from the electrode substrate; measuring tensile strength of each of the prepared electrode specimens; and comparing tensile strengths measured for respective electrode specimens.

Advantageous Effects

According to a system and method for measuring the physical property of an electrode specimen of the present invention, it is possible to suppress a slipping phenomenon of an electrode specimen and prevent disconnection of a gripping portion during a tensile test for specimens by forming a masking tape on the gripping portion of the electrode specimens.

DETAILED DESCRIPTION OF THE PREFERRED EMBODIMENTS

As the inventive concept allows for various changes and numerous embodiments, particular embodiments will be illustrated in the drawings and described in detail in the text. However, this is not intended to limit the present invention to the specific form disclosed, and it should be understood to include all changes, equivalents, and substitutes included in the spirit and scope of the present invention.

In this application, it should be understood that terms such as "include" or "have" are intended to indicate that there is a feature, number, step, operation, component, part, or a combination thereof described on the specification, and they do not exclude in advance the possibility of the presence or addition of one or more other features or numbers, steps, operations, components, parts or combinations thereof. Also, when a portion such as a layer, a film, an area, a plate, etc. is referred to as being "on" another portion, this includes not only the case where the portion is "directly on" the another portion but also the case where further another portion is interposed therebetween. On the other hand, when a portion such as a layer, a film, an area, a plate, etc. is referred to as being "under" another portion, this includes not only the case where the portion is "directly under" the another portion but also the case where further another portion is interposed therebetween. In addition, to be disposed "on" in the present application may include the case disposed at the bottom as well as the top.

The present invention relates to a system for measuring a physical property of an electrode specimen. Specifically, according to a system for measuring the physical property of an electrode specimen of the present invention, one-side gripping portion or both-side gripping portions of an electrode specimen are covered by a masking tape, and the electrode specimen is moved in a pulling direction while fixing the electrode specimen using a gripping unit, to measure the physical property of the electrode specimen. In one example, a system for measuring a physical property of an electrode specimen according to the present invention includes: an electrode specimen having a structure where a masking tape is formed on one-side gripping portion or both-side gripping portions; and a tensile strength measuring unit which includes a first gripping unit for gripping the one-side gripping portion of the electrode specimen and a second gripping unit for gripping an other-side gripping portion, and measures tensile strength for the electrode specimen by moving the electrode specimen in a pulling direction by at least one of the first and second gripping units which are located on a same line. Further, each the first and second gripping units includes a pressing jig having a structure facing each other while having a gripping portion of the electrode specimen therebetween, and wherein the pressing jig includes a rubber or metal jaw face.

In the present invention, the physical property is measured in a state that the gripping portion of an electrode specimen has been taped by a masking tape or a masking tape has been attached on one or both surfaces of the gripping portion. Through the masking tape process, it is possible to prevent a slipping phenomenon between the electrode specimen and the gripping unit of the tensile strength measuring unit, and prevent disconnection of the gripping portion of the electrode specimen.

The electrode substrate has a structure including a coated part where an electrode mixture layer has been formed, and a non-coated part where an electrode mixture layer has not been formed on the surface of a metal current collector. In order to accurately measure physical properties for an electrode substrate, it is necessary to perform measurement for an electrode specimen extracted from a coated part region and an electrode specimen extracted from a region including a coated part and a non-coated part.

In one embodiment, a system for measuring a physical property of an electrode specimen according to the present invention has a structure including only a coated part region where an electrode mixture layer has been formed on the surface of a metal current collector. In this case, the electrode specimen has a structure where a masking tape is formed at each of the both-side gripping portions, and the pressing jig of the first and second gripping units includes a metal jaw face where a grid is formed on a surface. The coated part region includes a metal current collector in the form of a metal foil, and an electrode mixture layer formed on one surface or both surfaces of the metal current collector.

A phenomenon that an electrode mixture layer is detached or an electrode specimen is slipped may occur in a state that is pressed by a gripping unit during the process of measuring the physical property of the electrode specimen. In the present invention, it is possible to prevent such a detachment or slipping phenomenon of the electrode mixture layer by attaching a masking tape on the both-side gripping portions of the electrode specimen to be measured. Further, the masking tape protects the gripping portion of the electrode specimen and prevents the disconnection of the gripping portion during the physical property measuring process. Further, the metal jaw face is a portion facing the electrode specimen, and in the present invention, the fixing force for the electrode specimen of the gripping unit is enhanced by forming a grid on the surface of the metal jaw face.

In another embodiment, a system for measuring a physical property of an electrode specimen according to the present invention has a structure that an electrode specimen includes a coated part region where an electrode mixture layer has been formed on a metal current collector, and one end of the electrode specimen includes a non-coated part region where an electrode mixture layer has not been formed on the surface of a metal current collector. In this case, the electrode specimen has a structure where a masking tape is formed on a gripping portion of a coated part region, and a masking tape is not formed on a gripping portion of a non-coated part region, the pressing jig of the first gripping unit grips the gripping portion of the coated part region and includes a metal jaw face where a grid is formed on a surface, and the pressing jig of the second gripping unit grips the gripping portion of the non-coated part region and includes a rubber jaw face.

A phenomenon that an electrode mixture layer is detached or an electrode specimen is slipped may occur in a state that is pressed by a gripping unit during the process of measuring the physical property of the electrode specimen. In the present invention, it is possible to prevent such a detachment or slipping phenomenon of the electrode mixture layer by attaching a masking tape on the gripping portion of the coated part region among the both-side gripping portions of the electrode specimen to be measured. The gripping portion at the opposite side of the electrode specimen has a structure where a metal current collector has been exposed, and a separate masking tape treatment is not applied to the gripping portion. Further, the pressing jig of the first gripping unit grips the gripping portion of the coated part region and enhances of the fixing force with the masking-taped gripping portion by applying a metal jaw face where a grid has been formed on the surface. The pressing jig of the second gripping unit grips the gripping portion of the non-coated part region and enhances the fixing force with the non-coated part, where the metal foil has been exposed, by applying a rubber jaw face.

In one example, the metal jaw face has a structure where a debossed or embossed grid is formed on a surface. It is possible to enhance the fixing force with the masking-taped gripping portion of the electrode specimen by forming a grid pattern on the surface of the metal jaw face. In the present invention, the grid means a grid or checkerboard scale pattern and is a general term indicating a form where two or more parallel patterns cross each other. In a specific example, an average recess depth or an average protrusion height of the debossed or embossed grid formed on the surface of the metal jaw face is in a range of 0.001 to 1 mm. For example, the average recess depth or protrusion height of the grid is in the range of 0.001 to 0.1 mm, 0.001 to 0.01 mm, 0.01 to 0.1 mm, or 0.01 to 0.05 mm. In the present invention, it is possible to enhance the fixing force with the gripping unit while not deteriorating the mechanical property of the electrode specimen gripping portion by forming a very low level of recess or protruding pattern.

In another example, the pressing jig, which forms at least one of the first and second gripping units, is detachable from a frame which forms a tensile strength measuring unit. For example, the pressing jig forming the first gripping unit has a structure fixed by a metal jaw face, and the pressing jig forming the second gripping unit has a detachable structure. In another example, all of the pressing jigs forming the first and second gripping units have a detachable structure. The jaw face is replaced to correspond to the type of the electrode specimen to be measured by applying a structure that a pressing jig is detachable. Specifically, a metal jaw face is applied to the electrode specimen including only a coated part region in both the first and second gripping units. However, with respect to the electrode specimen, which includes a coated part region and includes a non-coated part region at one end, it is appropriate for a metal jaw face to be applied to the first gripping unit, and for a rubber jaw face to be applied to the second gripping unit.

The metal jaw face can be formed of various types of metals, for example, carbon steel, stainless steel, aluminum or its alloys, and the like. In addition, the rubber jaw face may be made of various types of artificial or natural rubber materials, and may be formed of a plastic material as needed.

In a specific example, the pressing jig, which forms at least one of the first and second gripping units, is detachable from a frame which forms a tensile strength measuring unit. At this time, the pressing jig is fastened by one or more of fastening scheme between a groove and a protrusion, a bolt fastening scheme, and a spring fastening scheme. For example, a protrusion protruding in a tensile strength measuring unit frame may be formed, and the pressing jig may have a structure where a groove is fastened along the protrusion. In another example, the pressing jig may have a structure fastened with a frame forming a tensile strength measuring unit by a bolt fastening scheme.

In another example, masking tapes are formed on both surfaces of the gripping portion and overlap each other. In the present invention, the physical property is measured in a state that the gripping portion of an electrode specimen has been taped by a masking tape or a masking tape has been attached on one or both surfaces of the gripping portion. For example, masking tapes are attached on both surfaces of the gripping portion to form a terrace, and the masking tapes attached on the both surfaces overlap each other. Through this, the increase in the thickness of the electrode specimen due to the masking tape is minimized, and more stable and firm fixation is possible.

Further, the present invention provides a method of measuring a physical property of an electrode specimen by using the above-described system for measuring a physical property of an electrode specimen. The method of measuring the physical property of an electrode specimen according to the present invention provides precise and stable physical property measurement.

In one embodiment, a method of measuring a physical property of an electrode specimen according to the present invention includes: preparing at least one of an electrode specimen extracted in a machine direction (MD) direction in a coated part region from an electrode substrate, an electrode specimen extracted in a transverse direction (TD) direction in the coated part region from the electrode substrate, and an electrode specimen extracted in a region including the coated part region and a non-coated part region from the electrode substrate; and measuring tensile strength of the prepared electrode specimen.

Further, electrode specimens, which are extracted from a region including a coated part region and a non-coated part region, may include an electrode specimen maintaining an insulating tape formed on the boundary region of the coated part and the non-coated part, and an electrode specimen from which the insulating tape has been removed.

According to the present invention, it is possible to perform comprehensive and various physical property evaluations for electrode specimens by performing physical property measurement for the electrode specimen extracted from respective regions.

In another example, the method of measuring a physical property of an electrode specimen according to the present invention includes: preparing at least two of an electrode specimen extracted in an MD direction in a coated part region from an electrode substrate, an electrode specimen extracted in a TD direction in the coated part region from the electrode substrate, and an electrode specimen extracted in a region including the coated part region and a non-coated part region from the electrode substrate; measuring tensile strength of each of the prepared electrode specimens; and comparing tensile strengths measured for respective electrode specimens. Further, electrode specimens, which are extracted from a region including a coated part region and a non-coated part region, may include an electrode specimen maintaining an insulating tape formed on the boundary region of the coated part and the non-coated part, and an electrode specimen from which the insulating tape has been removed. According to the present invention, it is possible to perform comprehensive and various physical property evaluations for electrode specimens by performing physical property measurement for the electrode specimen extracted from respective regions. For example, it is possible to observe the change in physical properties of an electrode substrate according to the process flow by comparing electrode specimens extracted respectively in a machine direction (MD) and a transverse direction (TD). Further, mechanical property evaluation for the boundary region of a coated part and a non-coated part is possible by measuring physical properties of an electrode specimen including both a coated part region and a non-coated part region. In the product manufacturing process, it is necessary to evaluate the physical properties of the 3 or four types of electrode specimens described above and comprehensively apply the evaluation result to product quality control.

In one embodiment, the method of measuring the physical property of an electrode specimen according to the present invention can be performed through a tensile test. For example, after setting the load of the tensile tester to zero, the loading rate was set to be in the range of 10 to 50 mm/min to perform a tensile test. For example, the tensile strength of the electrode specimen can be measured by using the Micro Tension Tester (Instron 5943) with 1 KN Road Cell.

Hereinafter, the contents of the present invention are described through examples and drawings, but the following examples are used to illustrate the present invention, and the scope of the present invention is not limited by the scope of the examples and the drawings.

First Embodiment

Figure 3:
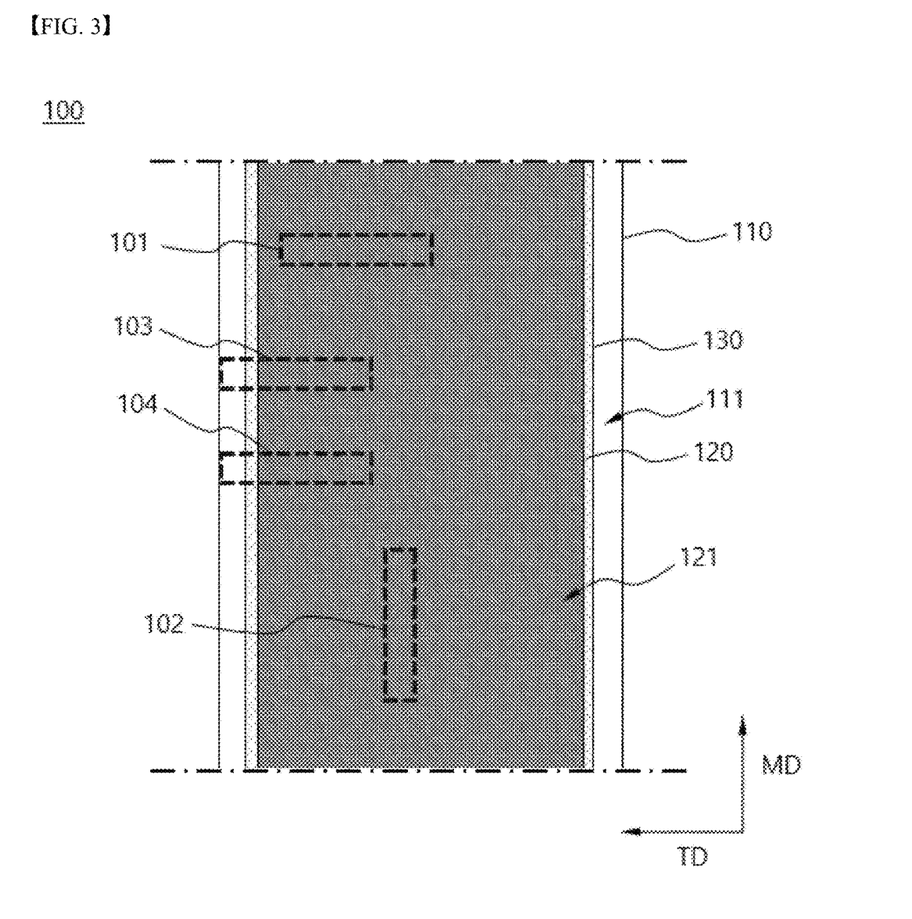
FIG. 3 illustrates various regions where electrode specimens are extracted from an electrode substrate.

FIG. 3 illustrates various regions where electrode specimens are extracted from an electrode substrate. Referring to FIG. 3, an electrode substrate 100 has a structure where an electrode mixture layer 120 is formed on an electrode current collector 110 formed of a metal foil, and an insulating tape 130 is attached on the edge region of the electrode mixture layer 120. A region, where the electrode mixture layer 120 has been formed in the electrode substrate 100, is a coated part 121, and a region, where the electrode mixture layer 120 has not been formed and the electrode mixture layer 110 has been exposed, is a non-coated part 111. In the present invention, electrode specimens 101, 102, 103 and 104 are extracted from various regions of an electrode substrate 100, and physical properties of the electrode specimens are measured. For example, it is possible to measure physical properties of an electrode specimen 101, which is extracted in a transverse direction (TD) from a coated part 120 region of an electrode substrate 100, an electrode specimen 102, which is extracted in a machine direction (MD) from the coated part 120 region, an electrode specimen 103, which is extracted from the edge region to include both the coated part 120 and the non-coated part 110, and an electrode specimen 104, which is extracted from the edge region to include both the coated part 120 and the non-coated part 110 and from which the insulating tape 130 has been removed.

Figure 4:
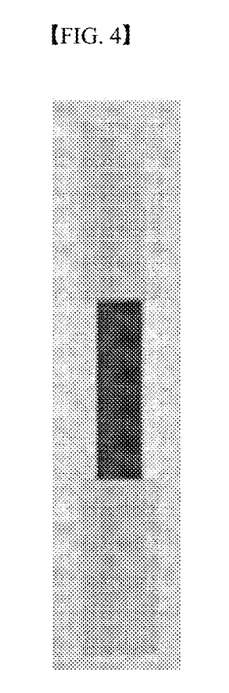
FIG. 4 is a photograph obtained by photographing an electrode specimen according to an embodiment of the present invention.

FIG. 4 is a photograph obtained by photographing an electrode specimen according to an embodiment of the present invention. Referring to FIG. 4, the electrode specimen is an electrode specimen which has been extracted in a machine direction (MD) from the coated part region of an electrode specimen. The length of the specimen was 150 mm, and the width of the specimen was 12.7 mm. Further, the specimen has a structure where masking tapes are attached on both sides of the gripping portion to overlap each other. The interval between masking tapes attached to the upper end gripping portion and the lower end gripping portion is 50 mm.

Figure 5:
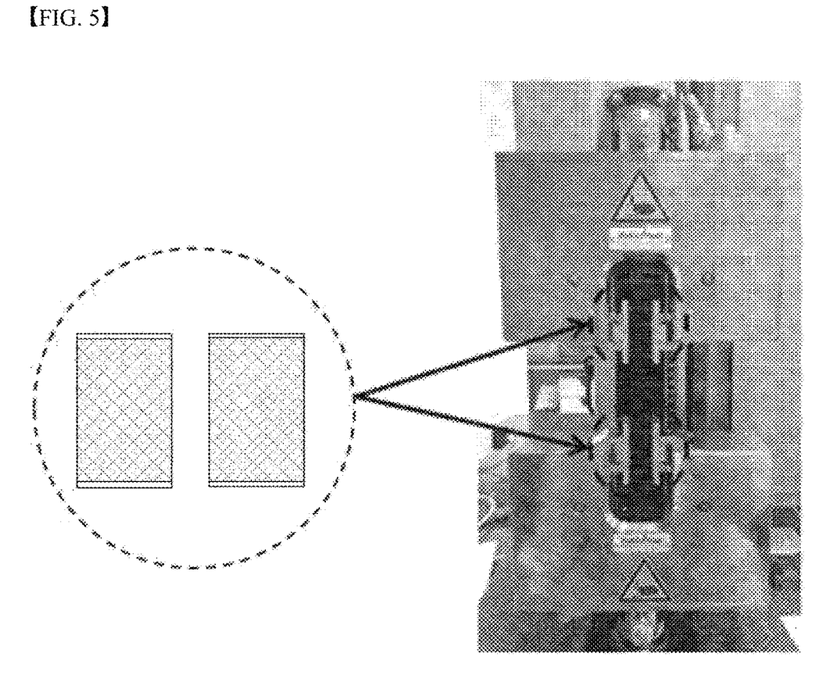
FIG. 5 shows a photograph obtained by photographing an electrode physical property measuring apparatus according to the present invention and its partial enlarged view.

FIG. 5 shows a photograph obtained by photographing an electrode physical property measuring apparatus according to the present invention and its partial enlarged view. Specifically, FIG. 5 illustrates an apparatus for measuring tensile strength of an electrode specimen, and the apparatus includes a first gripping unit for gripping the one-side gripping portion of the electrode specimen and a second gripping unit for gripping an other-side gripping portion, and measures tensile strength for the electrode specimen by moving the electrode specimen in a pulling direction by at least one of the first and second gripping units which are located on a same line. Further, the first and second gripping units each includes a pressing jig, and the pressing jig includes a metal jaw face formed of stainless steel. The surface structure of the metal jaw face is shown in an enlarged form in a left circle. The surface of the metal jaw face has a structure where a debossed grid pattern has been formed. In the tensile test, tensile force (N) was measured until the electrode specimen was disconnected while pulling the electrode specimen at the rate of 20 mm/min.

Figure 6:
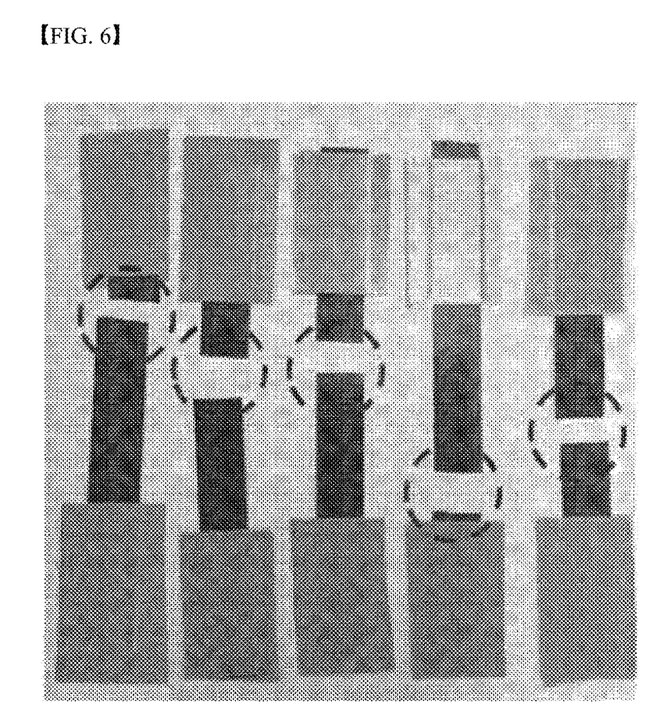
FIG. 6 shows photographs obtained by photographing 5 electrode specimens, which were extracted at the same position, after measuring tensile strengths of the electrode specimens by using the electrode physical property measuring apparatus of FIG. 5.

FIG. 6 shows photographs obtained by photographing 5 electrode specimens, which were extracted at the same position, after measuring tensile strengths of the electrode specimens by using the electrode physical property measuring apparatus of FIG. 5.

Referring to FIG. 6, each of the electrode specimens was not disconnected in a region where a masking tape has been attached.

Second Embodiment

Figure 7:
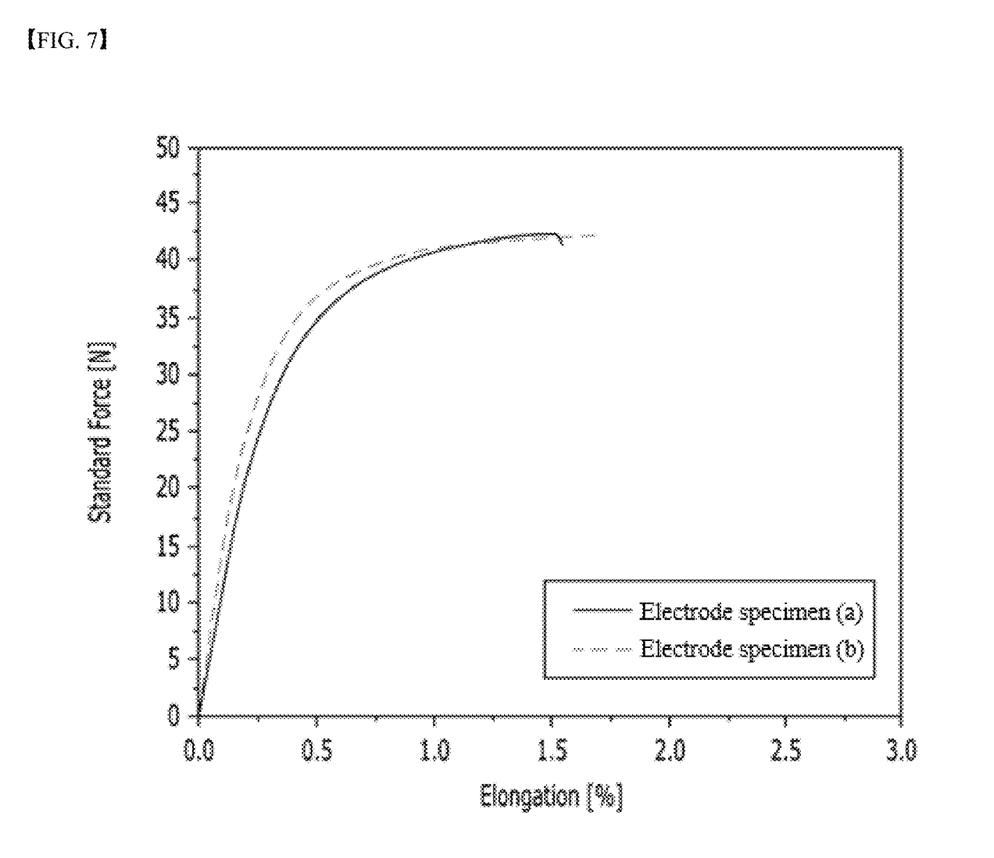
FIG. 7 is graph illustrating a tensile strength measurement result in which the electrode physical property measuring apparatus of FIG. 5 has been applied to electrode specimens of FIG. 4.

FIG. 7 is graph illustrating a tensile strength measurement result in which the electrode physical property measuring apparatus of FIG. 5 has been applied to electrode specimens of FIG. 4. In FIG. 7, the electrode specimen (a) indicates a case where the electrode physical property measuring apparatus of FIG. 5 is applied to the electrode specimen of FIG. 4, and a grid pattern is not formed on the surface of a metal jaw face. The electrode specimen (b) indicates a case where the electrode physical property measuring apparatus of FIG. 5 is applied to the electrode specimen of FIG. 4, and a grid pattern is formed on the surface of the metal jaw face. When electrode specimens (a) and (b) are compared, the final tensile strengths (standard forces, N) are similar, but the slopes of the graphs are different. This indicates that in the electrode specimen (b), the slip of the electrode specimen has rarely occurred, and a more precise measurement is possible.

Third Embodiment

Figure 8:
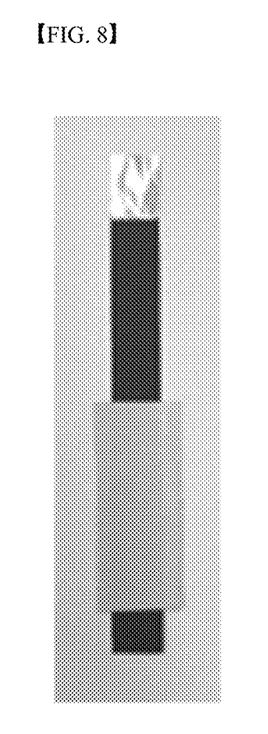
FIG. 8 is a photograph obtained by photographing an electrode specimen according to another embodiment of the present invention.

FIG. 8 is a photograph obtained by photographing an electrode specimen according to another embodiment of the present invention. Referring to FIG. 8, the electrode specimen is an electrode specimen which has been extracted from the edge region to include both the coated part 120 and the non-coated part 110 and from which the insulating tape 130 has been removed. The length of the specimen was 150 mm, and the width of the specimen was 12.7 mm. Further, the specimen has a structure where masking tapes are attached on both sides in the lower end gripping portion to overlap each other. The upper end gripping portion has a form in which an electrode current collector has been exposed, and has not been masking-taped.

Figure 9:
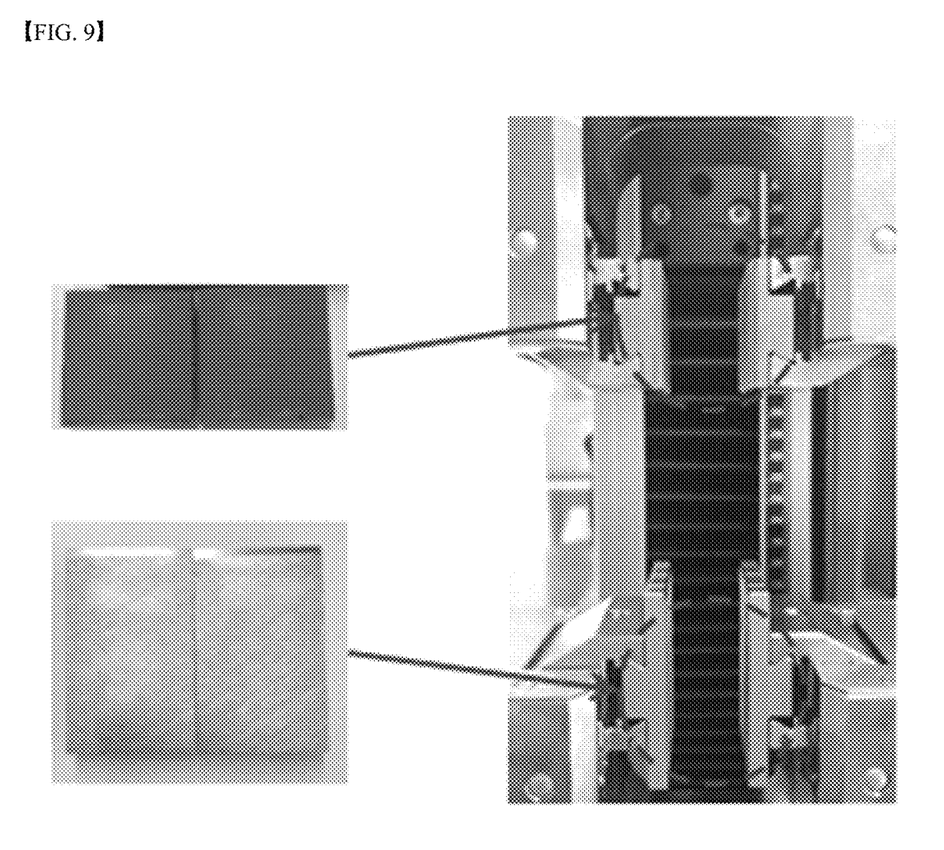
FIG. 9 shows a photograph obtained by photographing an electrode physical property measuring apparatus according to the present invention and its partial enlarged view.

FIG. 9 shows a photograph obtained by photographing an electrode physical property measuring apparatus according to the present invention and its partial enlarged view. FIG. 9 illustrates an apparatus for measuring tensile strength of an electrode specimen, and the apparatus includes a first gripping unit for gripping the one-side gripping portion of the electrode specimen and a second gripping unit for gripping an other-side gripping portion, and measures tensile strength for the electrode specimen by moving the electrode specimen in a pulling direction by at least one of the first and second gripping units which are located on a same line. Further, each of the first and second gripping units has a pressing jig having a structure facing each other. The first gripping unit at the lower end is formed of a pressing jig including a metal jaw face formed of stainless steel. The second gripping unit at the upper end is formed of a pressing jig including a rubber jaw face.

The first gripping unit fixes the lower end gripping portion where a masking tape has been attached in the electrode specimen of FIG. 7, and the second gripping unit fixes the upper end gripping portion where a masking tape has not been attached in the electrode specimen.

Further, each of the pressing jigs of the first and second gripping units has a structure which is detachable from a frame forming a tensile strength measuring apparatus, and specifically a structure which is fastened by a fastening scheme between a groove and a protrusion.

In the above, the present invention has been described in more detail through the drawings and examples. Accordingly, the embodiments described in the specification and the configurations described in the drawings are only the most preferred embodiments of the present invention, and do not represent all of the technical ideas of the present invention. It is to be understood that there may be various equivalents and variations in place of them at the time of filing the present application.

DESCRIPTION OF REFERENCE NUMERALS

10, 20, 101, 102, 103, 104: electrode specimen
11, 21: slipped portion
12, 22: disconnected part
100: electrode substrate
110: electrode current collector
111: non-coated part
120: electrode mixture layer
121: coated part
130: insulating tape

The invention claimed is:

1. A system for measuring a physical property of an electrode specimen, the system comprising:
   an electrode specimen including:
      a coated part region where an electrode mixture layer is on a surface of a metal current collector, a first gripping portion being defined at a first end of the electrode specimen in the coated part region and the first gripping portion having a tape thereon, and
      a non-coated part region at a second end of the electrode specimen where an electrode mixture layer is absent on the surface of the metal current collector, a tape being absent of the second end; and
   a tensile strength measuring unit that includes a first gripping unit configured to grip the first gripping portion of the electrode specimen and a second gripping unit configured to grip another end of the electrode specimen, the tensile strength measuring unit being configured to measure tensile strength for the electrode specimen by moving the electrode specimen in a pulling direction along a length direction of the electrode specimen by pulling with at least one of the first and second gripping units,
   wherein each of the first and second gripping units includes a pressing jig having gripping structures facing each other while having the first gripping portion and second gripping portion of the electrode specimen between respective ones of the first and second gripping units, and wherein the pressing jig includes a rubber or metal jaw face,
   wherein the pressing jig of the first gripping unit grips the first gripping portion of the coated part region and includes a metal jaw face where a grid is on a surface of the metal jaw face, and
   wherein the pressing jig of the second gripping unit grips the second gripping portion of the non-coated part region and includes a rubber jaw face.

2. The system of claim 1, wherein the grid is a debossed or embossed grid.

3. The system of claim 2, wherein an average recess depth or an average protrusion height of the debossed or embossed grid on the surface of the metal jaw face is in a range of 0.001 to 1 mm.

4. The system of claim 1, wherein the pressing jig of each of the first and second gripping units is detachable from a frame of the tensile strength measuring unit.

5. The system of claim 4, wherein the pressing jig of each of the first and second gripping units is detachable by at least one of a fastener between a groove and a protrusion, a bolt fastener, and a spring fastener.

6. A method of measuring a physical property of an electrode specimen using the system for measuring a physical property of an electrode specimen according to claim 1.

7. The method of claim 6, further comprising:
   providing at least one of an electrode specimen extracted in a Machine direction (MD) in a coated part region from an electrode substrate, an electrode specimen extracted in a transverse direction (TD) in the coated part region from the electrode substrate, and an electrode specimen extracted in a region including the coated part region and a non-coated part region from the electrode substrate; and
   measuring tensile strength of the prepared electrode specimen.

8. The method of claim 6, further comprising:
   providing at least two of an electrode specimen extracted in a machine direction (MD) in a coated part region from an electrode substrate, an electrode specimen extracted in a transverse direction (TD) in the coated part region from the electrode substrate, and an electrode specimen extracted in a region including the coated part region and a non-coated part region from the electrode substrate;
   measuring tensile strength of each of the prepared electrode specimens; and
   comparing tensile strengths measured for respective electrode specimens.

* * * * *